US011912050B2

(12) United States Patent
Gebhard

(10) Patent No.: US 11,912,050 B2
(45) Date of Patent: Feb. 27, 2024

(54) SCREEN PRINTING, IN PARTICULAR ROTARY SCREEN PRINTING OF TEXTILE MATERIALS

(71) Applicant: SPGPrints B.V., Boxmeer (NL)

(72) Inventor: Albrecht Gebhard, Boxmeer (NL)

(73) Assignee: PGPrints B.V., Boxmeer (NL)

( * ) Notice: Subject to any disclaimer, the term of this patent is extended or adjusted under 35 U.S.C. 154(b) by 39 days.

(21) Appl. No.: 17/611,958

(22) PCT Filed: Nov. 27, 2020

(86) PCT No.: PCT/EP2020/064663
§ 371 (c)(1),
(2) Date: Nov. 17, 2021

(87) PCT Pub. No.: WO2020/239817
PCT Pub. Date: Dec. 3, 2020

(65) Prior Publication Data

US 2022/0234377 A1 Jul. 28, 2022

(30) Foreign Application Priority Data

May 27, 2019 (NL) ...................................... 2023203

(51) Int. Cl.
*B41N 1/24* (2006.01)
*B41M 1/12* (2006.01)

(52) U.S. Cl.
CPC ............... *B41M 1/12* (2013.01); *B41N 1/247* (2013.01); *B41N 1/248* (2013.01)

(58) Field of Classification Search
CPC ...... B41C 1/145; B41F 15/0836; B41F 15/38; B41F 15/42; B41M 1/12; B41M 1/26; B41N 1/247; B41N 1/248; B41P 2217/10
See application file for complete search history.

(56) References Cited

U.S. PATENT DOCUMENTS

| | | | | |
|---|---|---|---|---|
| 3,759,800 A * | 9/1973 | Reinke | B41C 1/14 | 101/127 |
| 3,783,779 A * | 1/1974 | Greenwood | B41C 1/142 | 101/127 |
| 5,907,996 A * | 6/1999 | Mungenast | B41F 15/0836 | 101/484 |
| 11,667,115 B2 * | 6/2023 | Bartels | B41N 1/14 | 101/453 |

(Continued)

FOREIGN PATENT DOCUMENTS

| | | |
|---|---|---|
| EP | 0 527 655 A2 | 2/1993 |
| WO | 2011/046432 A1 | 4/2011 |
| WO | 2018/136473 A1 | 7/2018 |

*Primary Examiner* — Christopher E Mahoney
*Assistant Examiner* — Marissa Ferguson-Samreth
(74) *Attorney, Agent, or Firm* — Hoffmann & Baron, LLP

(57) ABSTRACT

A method of screen printing an image on a substrate, such as rotary screen printing, includes using a printing screen having a surface structure at its printing side and attached imaged lacquer layer having open areas defining the image to be printed, where the image includes pixel based design elements, the printing screen has a parallelogram pattern, preferably an orthogonal pattern, of screen openings and the open areas of the imaged lacquer layer representing the pixel based design elements are arranged in an orthogonal raster.

23 Claims, 7 Drawing Sheets

(56) References Cited

U.S. PATENT DOCUMENTS

2012/0174806 A1* 7/2012 Spoor ........................ B41C 1/14
101/129
2013/0032048 A1* 2/2013 Falcon ................... B41N 1/248
101/127

* cited by examiner

SCREEN PRINTING, IN PARTICULAR ROTARY SCREEN PRINTING OF TEXTILE MATERIALS

CROSS-REFERENCE TO RELATED APPLICATIONS

This application is the National Stage of International Application No. PCT/EP2020/064663, filed May 27, 2020, which claims the benefit of Netherlands Application No. 2023203, filed May 27, 2019, the contents of which is incorporated by reference herein.

FIELD OF THE INVENTION

The present invention relates to a method of screen printing, in particular rotary screen printing, an image on a substrate, an assembly of a printing screen and a imaged lacquer layer, a printing screen and printing device.

BACKGROUND OF THE INVENTION

Rotary screen printing of textile materials is known for a long time. In rotary screen printing a cylindrical printing screen having a pattern of screen openings that are delimited by interconnected dykes, e.g. an electroformed metal screen, is provided at its circumference with an imaged lacquer layer that has open areas that for one colour represent the image to be printed. During printing the substrate to be printed with the repeating image is conveyed along the rotating printing screen, and ink paste of the respective colour is forced by a squeegee or roller through the screen openings that communicate with the open areas in the imaged lacquer layer. The imaged lacquer layer having the open areas can be prepared e.g. from a photoemulsion by suitable exposure through a film or directly exposing to a laser, and subsequent washing and drying steps. A rotary screen printing device may have a plurality, e.g. up to 12-24 of rotary printing screens, one for each of the different colours to be printed and by which the total image is composed. Seamless rotary printing screens can be manufactured by electroforming, e.g. from nickel or nickel alloys. Generally for textile printing these screens have a hexagonal orientation of the screen openings.

One of the problems that screen printing devices encounter is the observation of Moire effects in the complete image once printed. Moire is an interference of at least two regular patterns that at least partly overlap each other, which interference affects the appearance of the printed image. Moire is likely to occur if the entire image to be printed is separated into regularly patterned lacquer layers for each process colour, taking into account the mesh size and open area of the printing screen, with the risks of overlap between the pattern of the screen openings and the open areas representing the image elements to be printed for the respective process colour. Also interference between printed image elements of different process colours may occur. The imaged lacquer layers comprising a regular pattern of open areas are typically oriented at an angle to the hexagonal pattern of the screen openings of the printing screen. However, the degree of freedom for selecting the angles is limited and interference between certain image elements in the imaged lacquer layer and the orientation of the pattern of screen openings in the printing screen occurs, which results in Moire defects and reduced image quality. In printing of textile materials which typically themselves also possess a regular pattern, e.g. from warp and weft threads, also interference of the printing screen pattern and/or imaged lacquer layer raster with the substrate pattern may occur leading to undesired Moire effects.

SUMMARY OF THE INVENTION

The invention aims at reducing the likelihood of Moire defects thereby improving the image quality. More specifically an object of the invention is to reduce Moire defects in rotary screen printing of textile materials and to improve the quality of the printed image, in particular the edge sharpness resulting in high print definition.

In a first aspect the invention provides a method of screen printing an image on a substrate, comprising the steps of providing a printing screen having a pattern of screen openings delimited by bridges and crossing points;

providing an imaged lacquer layer having open areas defining the image to be printed on the printing side of the printing screen; and forcing ink paste through the printing screen and the imaged lacquer layer from the squeegee side of the printing screen to the printing side thereof onto the substrate; wherein the image comprises pixel based design elements;

the printing screen has a pattern of screen openings that are arranged in a parallelogram raster; and the open areas of the imaged lacquer layer representing the pixel based elements are arranged in an orthogonal raster.

In the invention a printing screen is used that has, a network of crossing points and bridges, the printing side of the printing screen supports the imaged lacquer layer. The screen openings are arranged in a regular pattern and oriented according to a parallelogram raster. For example a diamond grid, advantageously an orthogonal grid such as a rectangular pattern, preferably a square raster. At the squeegee side the inner surface of the printing screen is sufficiently smooth to allow movement of the squeegee over this surface. The network of crossing points and bridges define the pattern of the screen openings. In other words the crossing points are connected to four bridges, that preferably are angled at 90° with respect to adjacent bridges. The image to be printed comprises pixel based design elements. Pixel based design elements are composed of pixels that are arranged in a regular grid, typically a square grid. Thus the imaged lacquer layer has also open areas that represent these pixel based design elements, which open areas are arranged accordingly in an orthogonal raster. Typical examples of such pixel based elements are halftone prints and designs of geometrical structures like grids, angled lines. If the open areas in the lacquer layer are made by laser imaging, e.g. focussing a moving laser beam on a laser sensitive coating that has been coated on the printing side of the printing screen thereby preparing an imaged lacquer layer, due to the resolution of the laser movement along the rotating printing screen in the longitudinal direction of the printing screen, then the open areas will be arranged in an orthogonal raster as well.

The invention is based on a better fit between the pattern of screen openings and the raster of the imaged lacquer layer. Compared to the common hexagonal pattern of screen openings which is the standard in textile rotary screen printing today, that has 3 main axes spaced at an angle of 60° apart, the parallelogram pattern of the screen openings in the printing screen according to the invention has only 2 axes of symmetry, which preferably are at an angle of 90°. Assuming that in order to avoid Moire defects the axes of the orthogonal raster of the imaged lacquer layer need to deviate from the axes of the parallelogram pattern of the printing screen the available angle range for appropriately orienting the imaged lacquer layer raster is wider for the printing screen according to the invention, in particular one having orthogonal or near orthogonal pattern axes. This wider range in relation to the image to be printed allows to avoid angles where undesired interference is likely to occur. In particular if the substrate is a textile material that also has an orthogonal orientation. By appropriately arranging the printing screen pattern and the raster of the imaged lacquer layer with respect to one another Moire defects can be prevented and the image quality improved. Thus the invention allows a better match between the parallelogram printing screen pattern and the orthogonal raster of the imaged lacquer layer.

Preferably the printing screen has a surface structure of the bridges and the crossing points at the printing side of the printing screen, wherein the crossing points have a higher thickness than the bridges. This 3D structure allows to improve the edge sharpness of the printed image, in particular line elements that are arranged at angles (almost) coinciding with axes of the screen opening pattern. When an edge of an open area in the imaged lacquer layer coincides with a bridge of the screen, ink paste from an adjacent open screen opening is allowed to flow onto that bridge up to the edge of the respective open area in the imaged lacquer layer, which improves the edge sharpness of the printed image element. In the absence of the lower bridges, a serrated edge shape of the printed image element would be the result. An improvement of the image quality in particular at line angles at or near 45° has been shown by the inventors.

The lower bridges also allow a better migration of ink paste beneath the bridges when printing larger image parts. Therefore the squeegee pressure can be reduced, which offers a lower mechanical load, less distortion of the printing screen resulting in better registration of the different process colours. Furthermore the printing pressure of the ink paste can be reduced, which results in reduced ink paste consumption and more brilliant colour appearance, as well as reduced imprint of the pattern of a textile material substrate improving the uniformity at macroscopic level.

Here it is noted that WO2011/046432 has disclosed a screen printing method, in particular for high resolution printing and printing of solid areas and raised images, using a printing screen having a 3D structure on its printing side. This prior art document is silent about Moire defects and any relationship between the pattern of the screen openings and that of the applied imaged lacquer layer.

In a preferred embodiment the method according to the invention is a rotary screen method, wherein the screen is a cylindrical screen for rotary screen printing. The method according to the invention is particularly beneficial for printing substrates that also comprise an orthogonal structure, especially textile materials.

The imaged lacquer layer having open areas can be produced in several ways. One way is laser engraving a coated layer of a laser sensitive material, for example a suitable polymer emulsion, according to the digital image data that are separated for a single colour from the entire image to be printed. The laser sensitive material is coated to the printing side of the printing screen and the laser beam is focussed on the laser sensitive material according to that image data. Typically the laser head is moved in the longitudinal direction of the rotary printing screen that is rotating itself.

Preferably the axes of the parallelogram pattern of the screen openings are arranged at an angle to the longitudinal axis of the rotary printing screen, thereby avoiding overlap with the typical pattern of the textile material. Thus the pattern of the screen openings is offset with respect to the typical orientation of the textile material substrate.

Preferred angle orientations of the axes of the preferred orthogonal pattern of the screen openings with respect to the longitudinal axis of the rotary printing screen are in the range of +10 to +20° and +100 to +110° respectively, such as about +15° and about +105°, more preferably in the range of −10 to −20° and +70 to +80° respectively, most preferably about −15° and +75° respectively, with margins of ±1°. Experiments have shown that the latter set of orthogonal axes of the screen opening pattern give the most improved image quality in combination with an orthogonal raster of the imaged lacquer layer.

In a further embodiment the axes of the orthogonal raster of the imaged lacquer layer are arranged at an angle, preferably at least 15°, to the axes of the orthogonal pattern of the screen openings.

Compared to a common hexagonal screen pattern of circular openings an orthogonal screen pattern of screen openings having the same diameter comprises less holes per surface unit and thus the open area of the screen is reduced. In order to achieve the same open area the hole size is slightly increased. For example a hole dimension of about 52 micrometers for a hexagonal screen is increased to about 55.5 micrometers for the screen openings in an orthogonal pattern thereof in order to achieve the same open area. The shape of the openings is not limited. Preferably the screen openings are rectangular, in particular square openings, having rounded corners due to the metal growth process in electroforming. The screen thickness is generally within the range of 50 to 800 μm. The screen opening dimensions are generally in the range of 30 to 200 μm or higher even up to 500 μm. Typically textile rotary printing screens have a thickness in the range of 80-400 μm and a largest dimension of the screen opening in the range of 80-150 μm.

The printing screen can be manufactured in many ways, like laser engraving, etching or electrochemical machining. Advantageously the printing screen is an electroformed metal printing screen, e.g. from nickel or nickel alloy, wherein a base screen skeleton is galvanically deposited on a cylindrical die in an appropriate bath, which skeleton is grown further under forced flow conditions of the bath liquid through the openings in the skeleton. Electroforming allows to manufacture thin seamless rotary printing screens having an appropriate strength.

In a preferred embodiment the size of a screen opening increases towards the printing side, thereby contributing to promoting ink paste flow in terms of easiness and spreading and to preventing blockage of screen openings.

In a second aspect the invention also resides in an assembly of a printing screen having a parallelogram pattern, preferably an orthogonal pattern, of screen openings delimited by bridges and crossing points, preferably having a surface structure of the bridges and the crossing points at the printing side of the screen, wherein the crossing points have a higher thickness than the bridges, and an imaged lacquer layer having open areas defining the image to be printed, wherein the image to be printed comprises pixel based design elements and the open areas of the imaged lacquer layer representing the pixel based design elements are arranged in an orthogonal raster. The assembly, obviously intended for use in (rotary) screen printing according to the invention, offers the same advantages and effects as explained above for the method according to the invention.

The above preferred embodiments related to the printing screen and/or imaged lacquer layer also apply to this assembly.

Furthermore the invention relates to a printing screen, obviously intended for use in the method according to the invention or for use in the assembly according to the invention, which printing screen has an orthogonal pattern of screen openings delimited by bridges and crossing points, a surface structure of the bridges and the crossing points at the printing side of the screen, wherein the crossing points have a higher thickness than the bridges. Upon intentionally using the printing screen according to the invention the above advantages and effects can be achieved.

Finally the invention relates to a screen printing device, in particular a rotary screen printing device, having a conveyor for conveying the substrate to be printed, at least one printing station having an ink paste supply and squeegee, typically a supply unit for supplying the substrate to be printed to the conveyor and a discharge unit for discharging the printed substrate, wherein the printing station comprises an assembly of a printing screen and imaged lacquer layer as outlined above.

BRIEF DESCRIPTION OF THE DRAWINGS

The invention is illustrated by the attached drawings, wherein:

FIGS. 5 and 6 show examples of printed images on textile, which images have been printed according to the invention (FIG. 5*a*.

FIG. 9 shows an embodiment of a printing screen having screen openings that increase in size from the squeegee side to the printing side thereof.

DETAILED DESCRIPTION OF THE INVENTION

Figure 1:
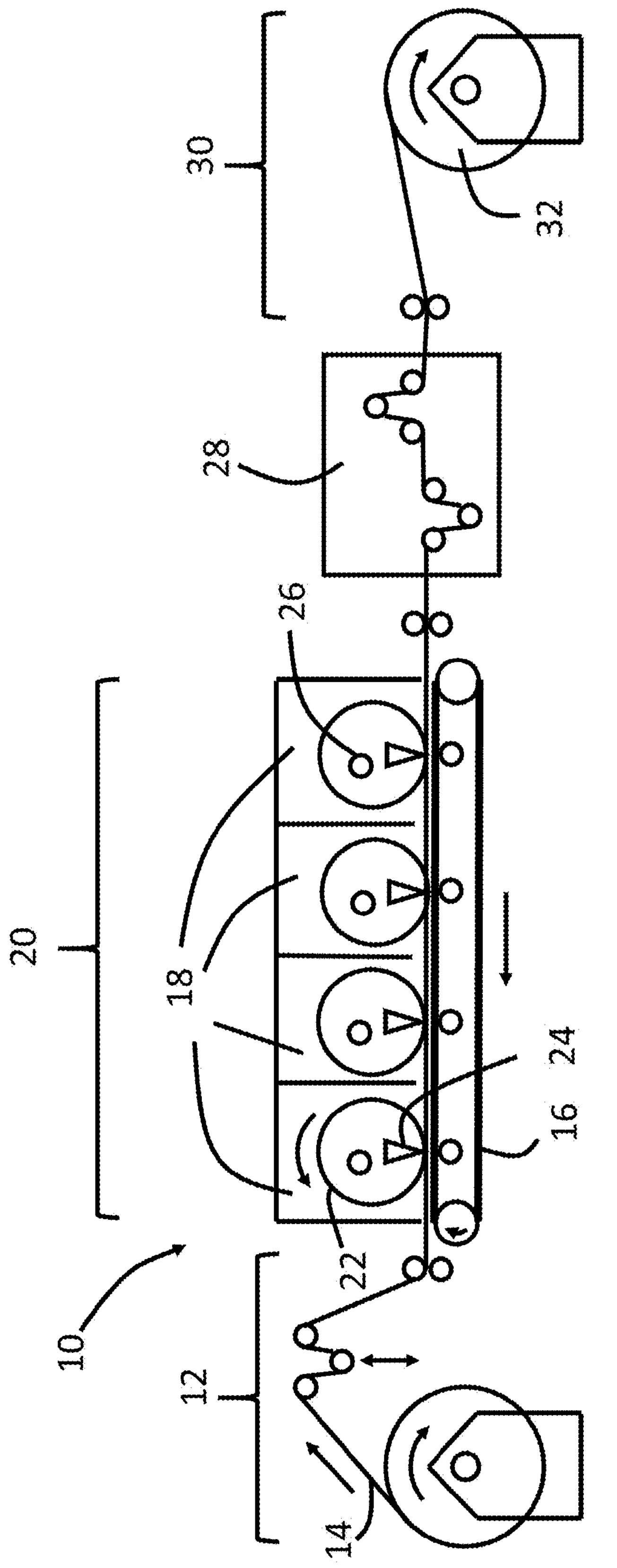
FIG. 1 is a diagrammatic representation of an embodiment of a rotary screen printing device.

FIG. 1 diagrammatically shows an embodiment of a textile rotary screen printing device which in its entirety is indicated by reference numeral 10. In this embodiment the printing device 10 comprises a feed section 12, in this case a controlled reel for unwinding the textile substrate 14 to be printed, which is conveyed, typically supported on a blanket 16, through the printing stations 18 of the printing section 20, where the process colours are applied onto the substrate 14 from the inside of a rotary printing screen 22 by means of a squeegee or roll 24 through the screen openings (see also FIG. 2) onto the substrate 14. The printing paste is supplied by a print paste feed 26 to the interior of the rotary printing screen 22 and the squeegee 24 that contacts the squeegee side of the printing screen 22, forces the ink paste through the screen openings. Only four printing stations 18 are shown in this representation. However, more printing stations could be added for additional process colours. After drying in corresponding drying station 28 the printed textile substrate 14 exits the printing device 10 at the discharge section 30, e.g. wound on a reel 32.

Figure 2:
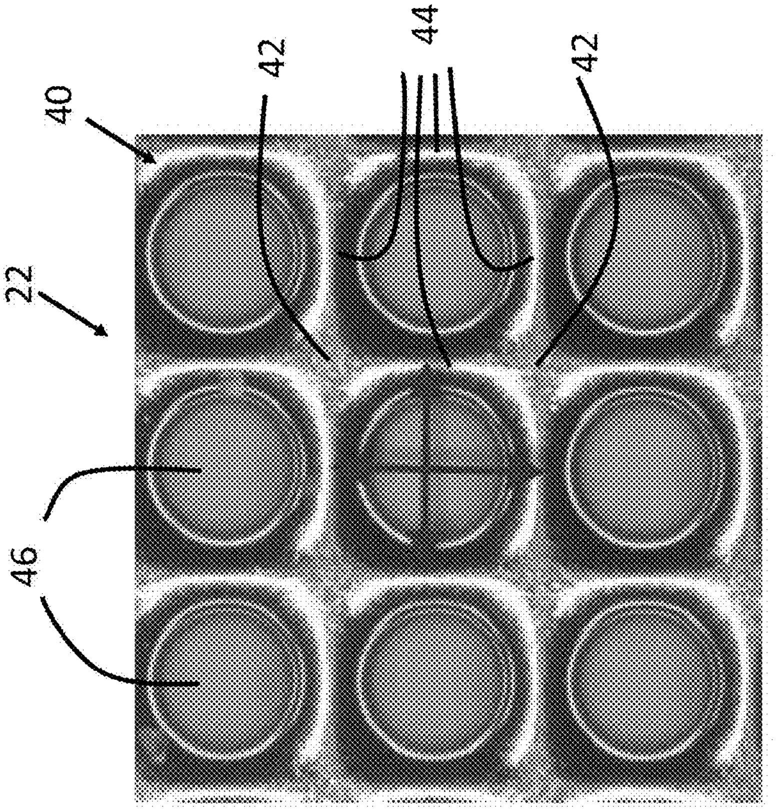
FIG. 2 is an embodiment of a printing screen having an orthogonal pattern of screen openings according to the invention.

FIG. 2 shows an embodiment of a printing screen according to the invention in top view. The printing side 40 of the printing screen 22 has a 3D surface structure, consisting of crossing points 42 that each connect four bridges 44, defining a screen opening 46. The squeegee side opposite the printing side is configured for smooth sliding contact with the squeegee. As indicated the crossing points 42 have a higher thickness than the bridges 44.

Figure 3:
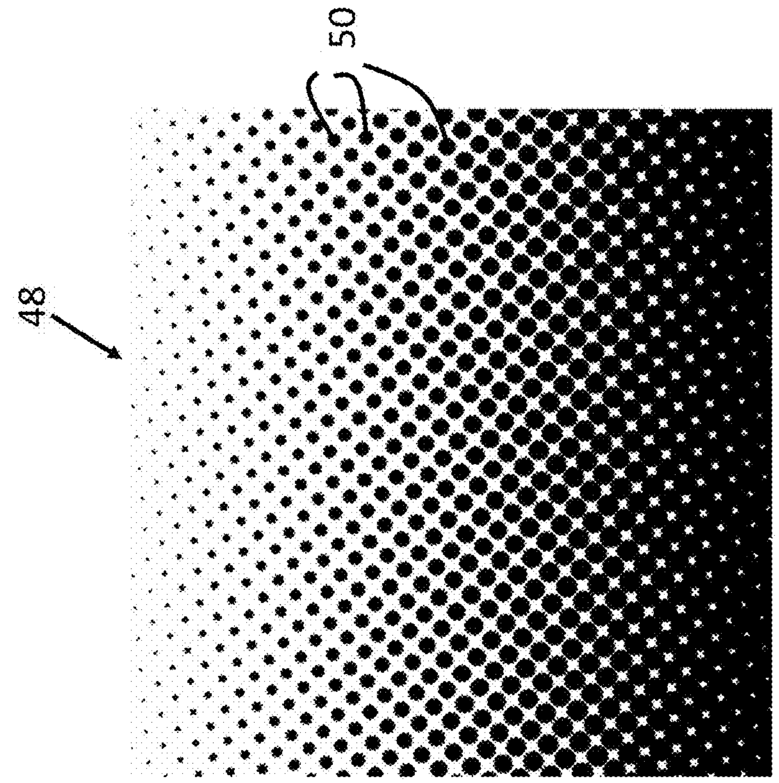
FIG. 3 is an embodiment of an imaged lacquer layer used in the invention.

FIG. 3 is an embodiment of a halftone imaged lacquer layer 48 showing an orthogonal raster of circular open areas 50.

Figure 4B:
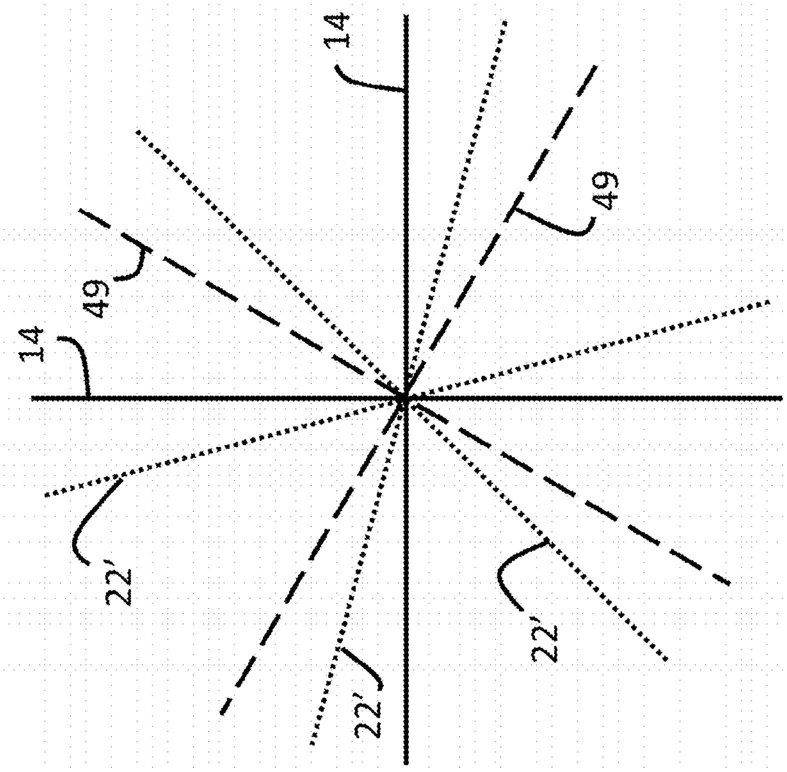
Prior Art Fig. 4b
FIG. 4 represents diagrams illustrating an effect of the invention (FIG. 4*a*) compared to prior art (FIG. 4*b*)
Figure 4A:
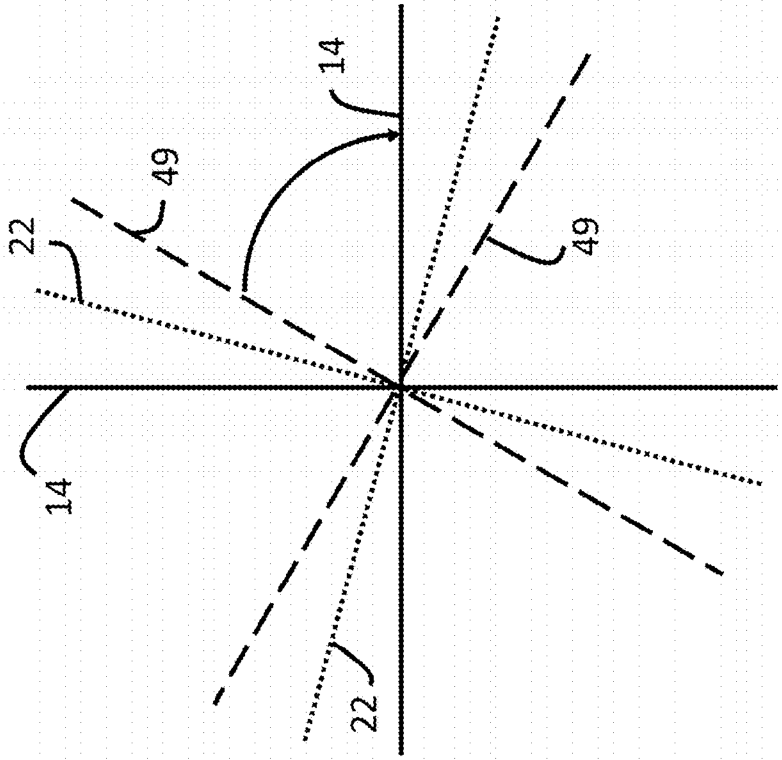

FIG. 4*a* shows the superposition of the textile substrate, the printing screen and the imaged lacquer layer. The axes 14 representing the orthogonal orientation of the textile substrate are drawn as solid lines, those axes 22 representing the orthogonal pattern of the printing screen in dotted lines, and the axes 49 of the orthogonal pattern of the imaged lacquer layer 48 in broken lines. Similarly FIG. 4*b* shows the same superposition, but for a printing screen 22' having a hexagonal pattern of screen openings, and thus 3 axes 22' are present. As is apparent for an orthogonal pattern of screen openings in the printing screen as shown in FIG. 4*a* the available range of angles (indicated by arrows) for arranging the imaged lacquer layer orientation with respect to the pattern of the printing screen is larger than the range for a hexagonal pattern (FIG. 4*b*).

Figure 5B:
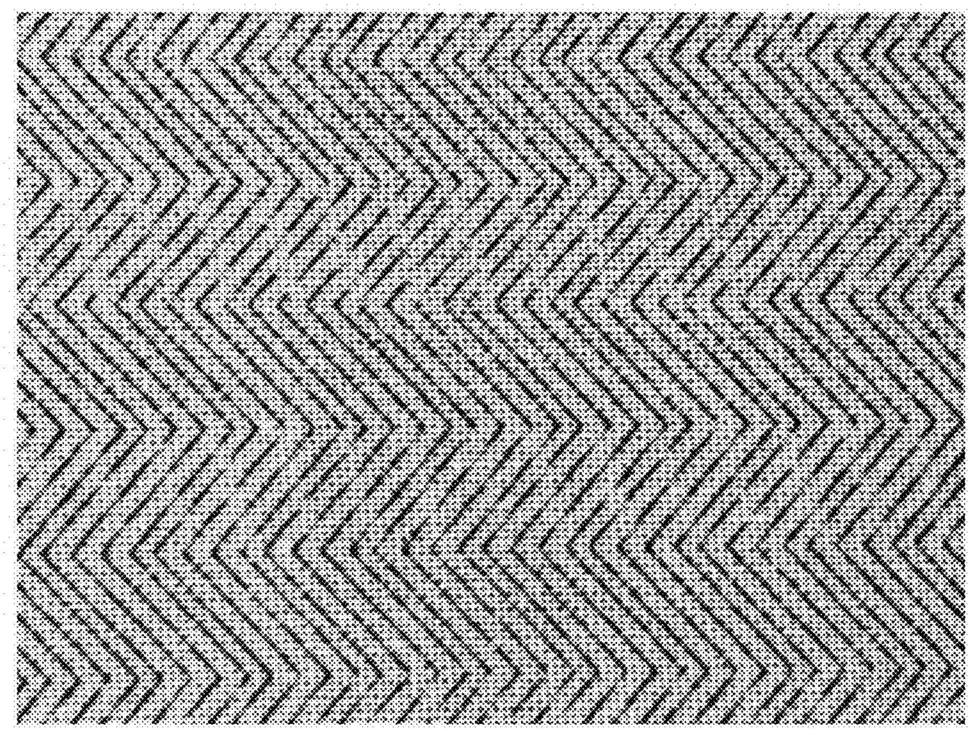
Fig. 5b Prior Art
Figure 5A:
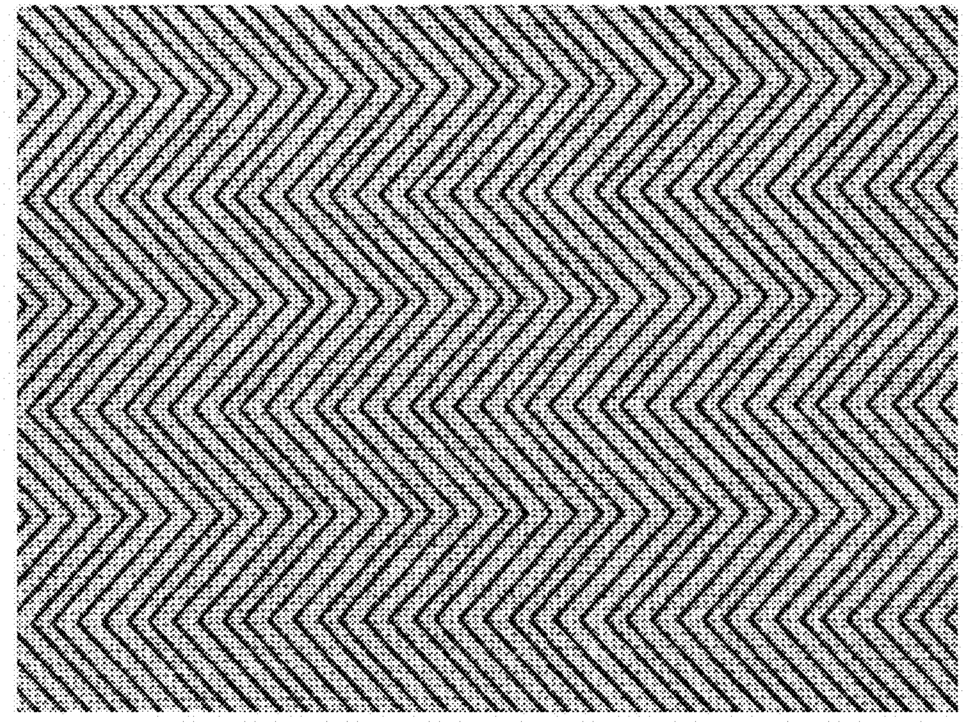

FIG. 5*a* shows part of a geometric design, in this case a zigzag structure of fine lines, screen printed with a 195 mesh rotary printing screen having an orthogonal pattern of screen openings according to the invention and FIG. 5*b* shows the same design that has been screen printed with a proprietary rotary printing screen (Novascreen™) of the same mesh and open area, but having a hexagonal pattern of screen openings.

Figure 6B:
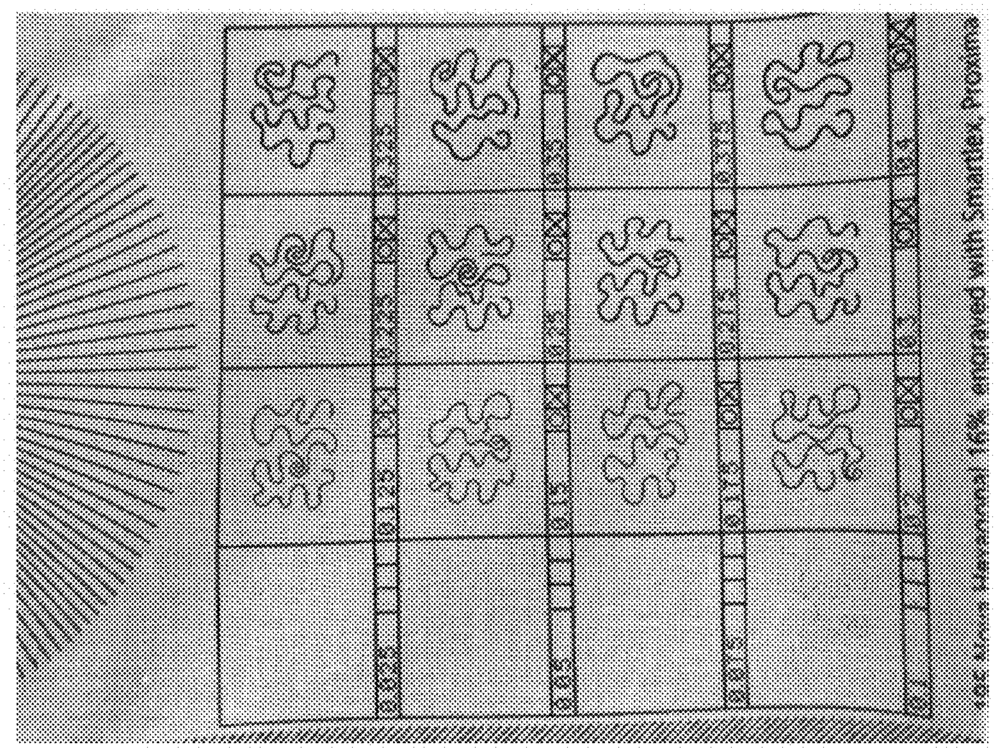
Fig. 6b Prior Art
FIG. 6*b*)
Figure 6A:
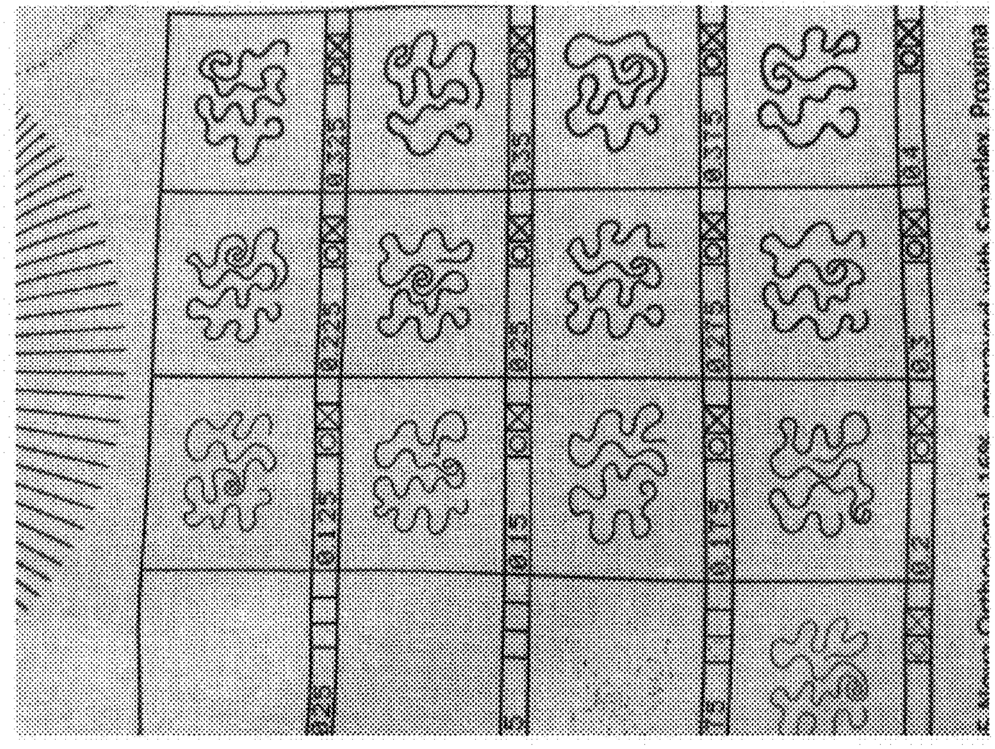
FIG. 6*a*) and according to the prior art (FIG. 5*b*.

FIG. 6*a* represents a printed line image using 195 mesh rotary printing screen having an orthogonal pattern of screen openings according to the invention, while FIG. 6*b* shows the same printed line image using the proprietary printing screen having a hexagonal pattern of screen openings.

As is apparent the orthogonal image elements of the images have a significant higher print quality when printed according to the invention. The printed image of FIG. 5*a* shows fine solid lines having a high edge definition, while these lines in FIG. 5*b* are sometimes broken and show a serrated edge. Comparing the printed images of FIGS. 6*a* and 6*b*, in particular the parts at the left hand lower corner, it appears that the example according to the invention allows to print extreme fine lines with high precision, while the prior art screen does not print at all.

Figure 7:
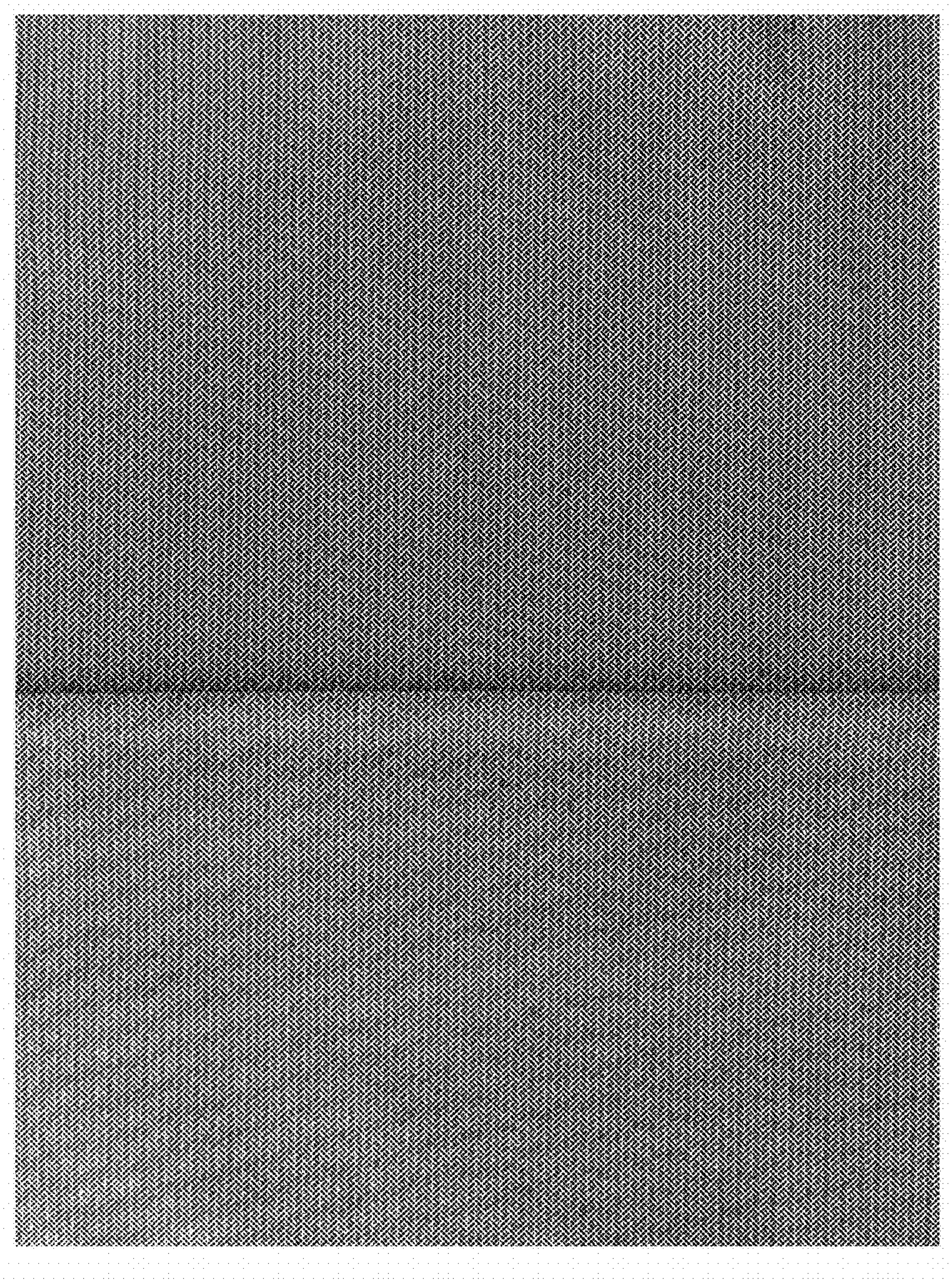
Fig. 7 Prior Art
FIGS. 7 and 8 show further examples of printed images on textile, that have been printed according to the invention and according to the prior art.
Figure 8:
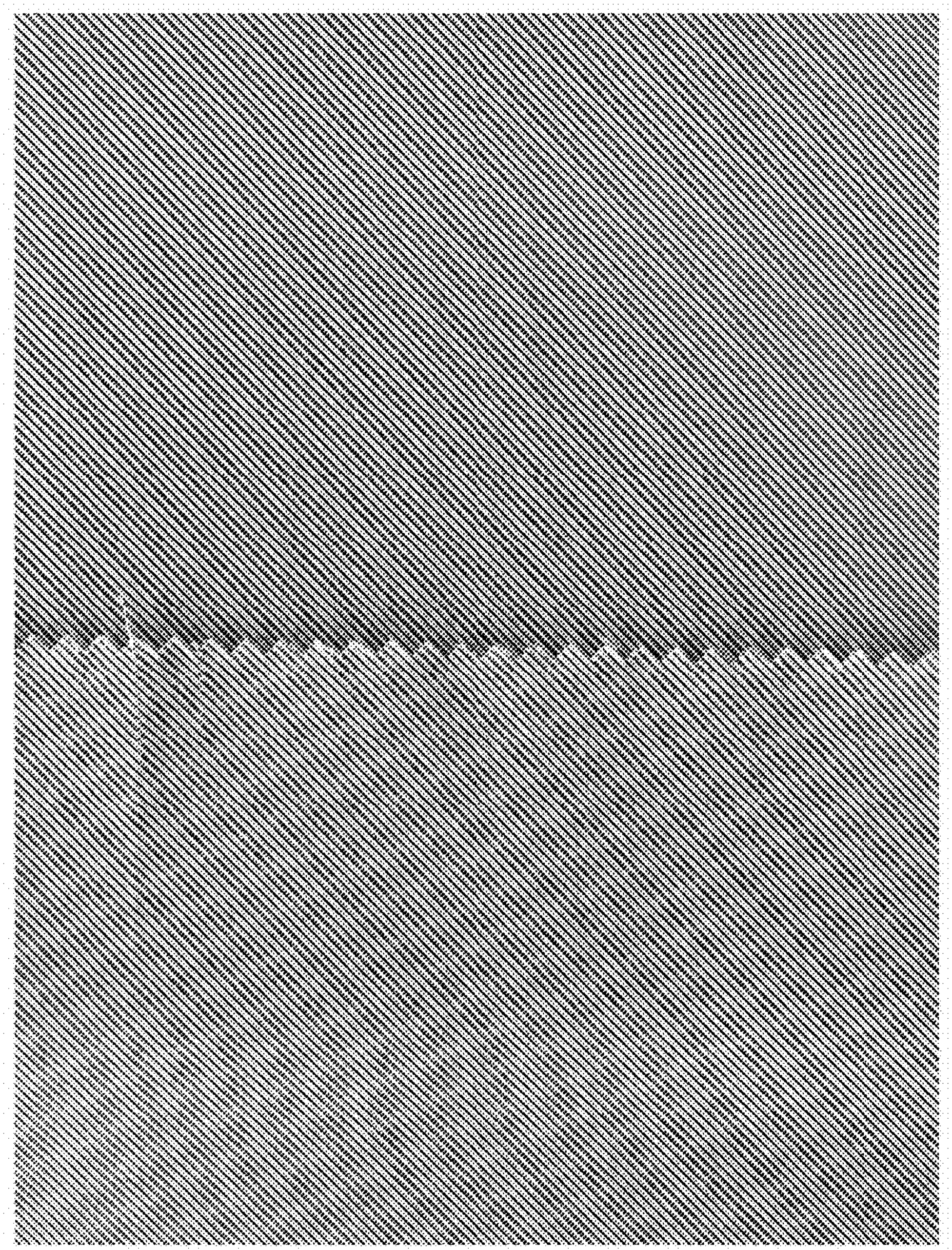
Fig. 8 Prior Art

FIGS. 7 and 8 are pictures of printed images that are printed using the same screen according to the invention (upper part) and the same prior art screen (lower part) as in the examples of FIGS. 5 and 6. It appears that the printed image according to the invention does not show any Moire defects, while the Moire interference is clearly visible with the naked eye in the lower parts.

FIG. 9 shows diagrammatically an embodiment of a printing screen having screen openings 46 delimited by the crossing points 42 and bridges 44. The size of the screen openings 46 increases from the squeegee side 45 to the printing side 40 thereof.

The invention claimed is:

1. A method of screen printing an image on a substrate comprising the steps of:

providing a printing screen having a printing side and a squeegee side opposite the printing side, and having a pattern of screen openings delimited by bridges and crossing points;

providing an imaged lacquer layer having open areas defining the image to be printed on the printing side of the printing screen; and forcing ink paste through the printing screen and the imaged lacquer layer from the squeegee side of the printing screen to the printing side thereof onto the substrate, wherein:

the image to be printed comprises pixel based design elements;

the printing screen has a pattern of screen openings that are oriented in a parallelogram raster; and the open areas of the imaged lacquer layer representing the pixel based design elements are arranged in an orthogonal raster.

2. The method according to claim 1, wherein the pattern of screen openings is an orthogonal pattern.

3. The method according to claim 1, wherein the printing screen is a cylindrical screen with a longitudinal axis for rotary screen printing.

4. The method according to claim 3, wherein the orthogonal pattern of the screen openings has axes that are arranged at an angle to the longitudinal axis of the rotary printing screen.

5. The method according to claim 1, wherein the substrate is a textile material.

6. The method according to claim 5, wherein the textile material has an orthogonal orientation.

7. The method according to claim 1, wherein the pixel based design elements comprise a halftone raster and/or a geometrical design.

8. The method according to claim 1, wherein the orthogonal raster of the imaged lacquer layer is arranged at an angle to the axes of the pattern of the screen openings.

9. The method according to claim 1, wherein the printing screen is an electroformed printing screen.

10. The method according to claim 1, wherein the printing screen has a surface structure of the bridges and the crossing points at the printing side of the printing screen, wherein the crossing points have a higher thickness than the bridges.

11. The method according to claim 1, wherein the screen openings have a square cross-section with rounded corners.

12. The method according to claim 1, wherein the screen openings have a size that increases from the squeegee side to the printing side.

13. An assembly of a printing screen having a printing side and a squeegee side opposite from the printing side, and having a pattern of screen openings delimited by bridges and crossing points, the screen openings being oriented in a parallelogram pattern, and an imaged lacquer layer having open areas defining an image to be printed, wherein the image to be printed comprises pixel based design elements and the open areas of the imaged lacquer layer representing the pixel based design image elements are arranged in an orthogonal raster.

14. The assembly according to claim 13, wherein the pattern of screen openings is an orthogonal pattern.

15. The assembly according to claim 14, wherein the orthogonal raster of the imaged lacquer layer is arranged at an angle to the orthogonal pattern of the screen openings.

16. The assembly according to claim 13, wherein the printing screen is a cylindrical printing screen with a longitudinal axis for rotary screen printing.

17. The assembly according to claim 16, wherein the axes of the orthogonal pattern of the screen openings are arranged at an angle to the longitudinal axis of the rotary printing screen.

18. The assembly according to claim 13, wherein the printing screen is an electroformed screen.

19. The assembly according to claim 13, wherein the printing screen has a surface structure of the bridges and the crossing points at the printing side of the printing screen, wherein the crossing points have a higher thickness than the bridges.

20. The assembly according to claim 13, wherein the screen openings have a square cross-section with rounded corners.

21. The assembly according to claim 13, wherein the screen openings have a size that increases from the squeegee side to the printing side of the printing screen.

22. The assembly according to claim 13, wherein the pixel based design elements comprise a halftone raster and/or a geometrical design.

23. A screen printing device, in particular a rotary screen printing device, having a conveyor for conveying a substrate to be printed, at least one printing station having an ink paste supply and squeegee, typically a supply unit for supplying the substrate to be printed to the conveyor and a discharge unit for discharging the printed substrate, wherein the printing station is provided with an assembly of a printing screen and imaged lacquer layer according to claim 13.

* * * * *